United States Patent [19]

Shoemaker

[11] 3,941,193

[45] Mar. 2, 1976

[54] GROUND TILLING APPARATUS

[76] Inventor: Paul W. Shoemaker, R.F.D. No. 1, Berne, Ind. 46711

[22] Filed: Oct. 10, 1974

[21] Appl. No.: 513,732

Related U.S. Application Data

[63] Continuation-in-part of Ser. No. 389,191, Aug. 17, 1973, abandoned, which is a continuation-in-part of Ser. No. 208,081, Dec. 15, 1971, abandoned.

[52] U.S. Cl. .................... 172/106; 172/46; 172/49; 172/52; 172/56; 172/60; 172/75; 172/108; 172/125; 172/547; 172/546; 172/774; 172/315

[51] Int. Cl.² .................... A01B 33/02; A01B 31/10

[58] Field of Search ........... 172/105, 106, 540, 556, 172/547, 464, 103, 104, 46, 49, 52, 56, 60, 75, 108, 125, 546, 774, 315

[56] References Cited
UNITED STATES PATENTS

| 67,634 | 8/1867 | Coleman | 172/547 |
|---|---|---|---|
| 100,183 | 2/1870 | Nusbaum | 172/106 |
| 941,678 | 11/1909 | Hobson | 172/104 X |
| 967,189 | 8/1910 | Hanson | 172/106 |
| 1,171,798 | 2/1916 | Malcor | 172/104 X |
| 1,315,918 | 9/1919 | Finseth | 172/547 |
| 2,512,733 | 6/1950 | Andersen et al | 172/464 |
| 2,612,094 | 9/1952 | Drozinski | 172/106 X |
| 2,614,375 | 10/1952 | Calkins | 172/547 X |
| 2,638,830 | 5/1953 | Kropp | 172/103 |
| 3,297,096 | 1/1967 | Woolridge | 172/464 |

FOREIGN PATENTS OR APPLICATIONS 559,741 6/1923 France ................................ 172/105

*Primary Examiner*—George J. Marlo

[57] ABSTRACT

Disclosed is a tilling apparatus characterized by a regulating drive connection between the towing tractor drive axle and the tiller shaft, the tiller tines having a modified arcuate configuration which provide a pocketed, rather than a furrowed or channeled, tilling depth profile.

6 Claims, 6 Drawing Figures

INVENTOR.
PAUL WATT SHOEMAKER
BY

INVENTOR.
PAUL WATT SHOEMAKER
BY

GROUND TILLING APPARATUS

BACKGROUND OF THE INVENTION

Field of the Invention

This application is a continuation-in-part of copending application Ser. No. 389,191, filed Aug. 17, 1973, now abandoned, which was a continuation-in-part application of application Ser. No. 208,081, filed Dec. 15, 1971, now abandoned.

Rotary tillers conventionally take the form of rotatable drag bars, having curved, ground penetrating tines which enter the ground to relatively shallow depth and break up the ground surface. These characteristically move the tines relatively rapidly and require substantial motive power. Conventional plows leave a packed, channeled track under the plowed soil which tends to promote water run-off loss with attendant erosion problems.

The concept of the present invention envisages a tiller construction in which the tines are formed so as to penetrate the ground to some depth with a minimum of resistance and which sequentially, upon ground entry, pry loose and lift chunks of earth to produce, with minimum soil compaction, a pocketed, as distinguished from channeled, tilling depth. Rotation of the tiller shaft, and consequently movement of the tines, is regulated by, and coordinated with, the driving axle of the controlling and towing tractor.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figure 1:
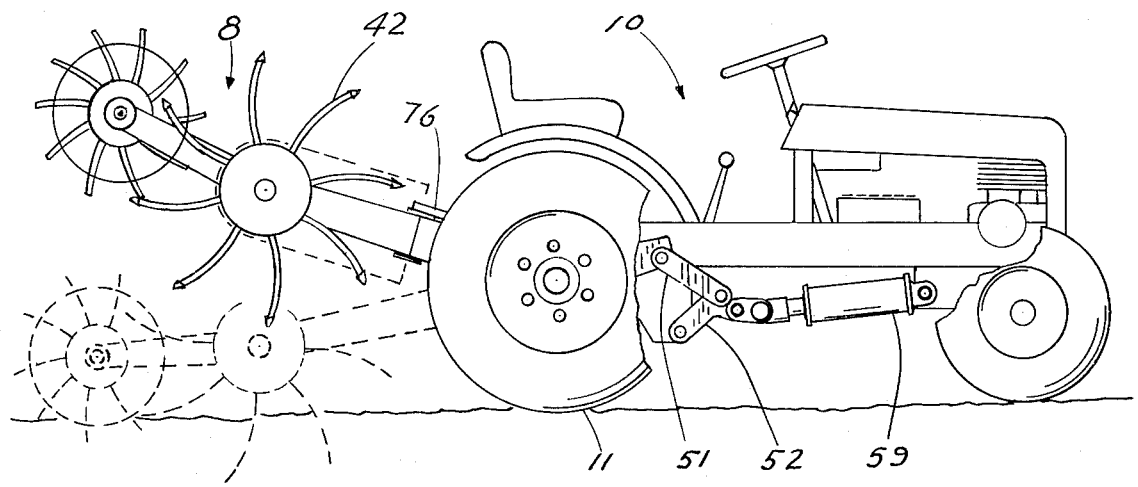
FIG. 1 is a side view of a small tractor with the tilling apparatus of the present invention attached.

There is shown at FIG. 1 a light tractor indicatd generally at 10, having rear drive wheels 11, the tilling apparatus of the present invention indicated generally at 8, being attached to the rear of the tractor.

Figure 2:
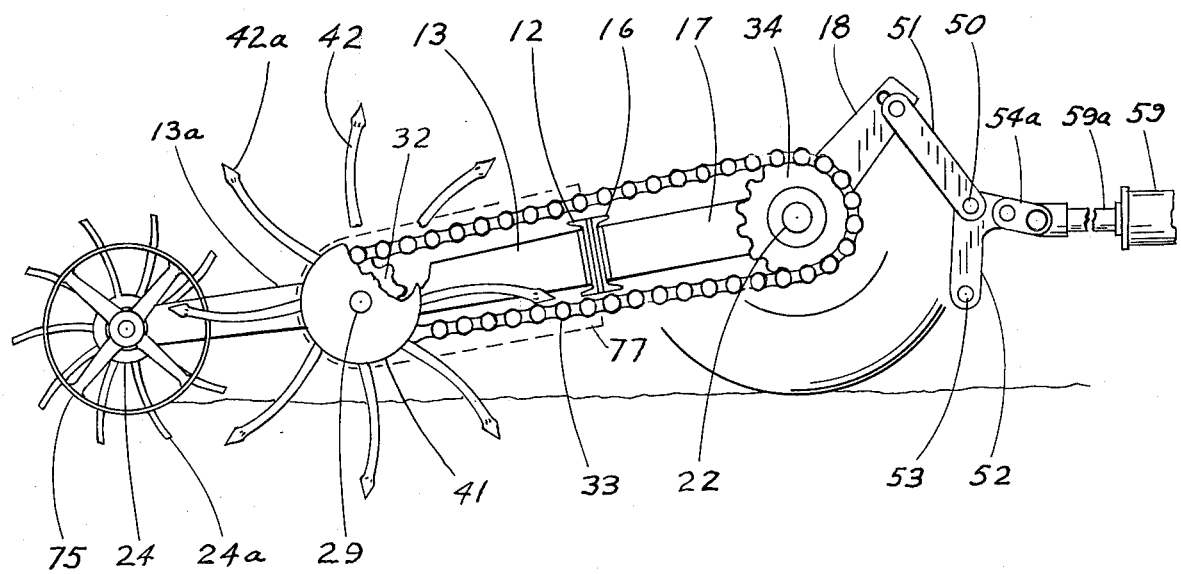
FIG. 2 is a fragmentary, side view of the tilling apparatus shown in FIG. 1 with the apparatus in operating position.
Figure 3:
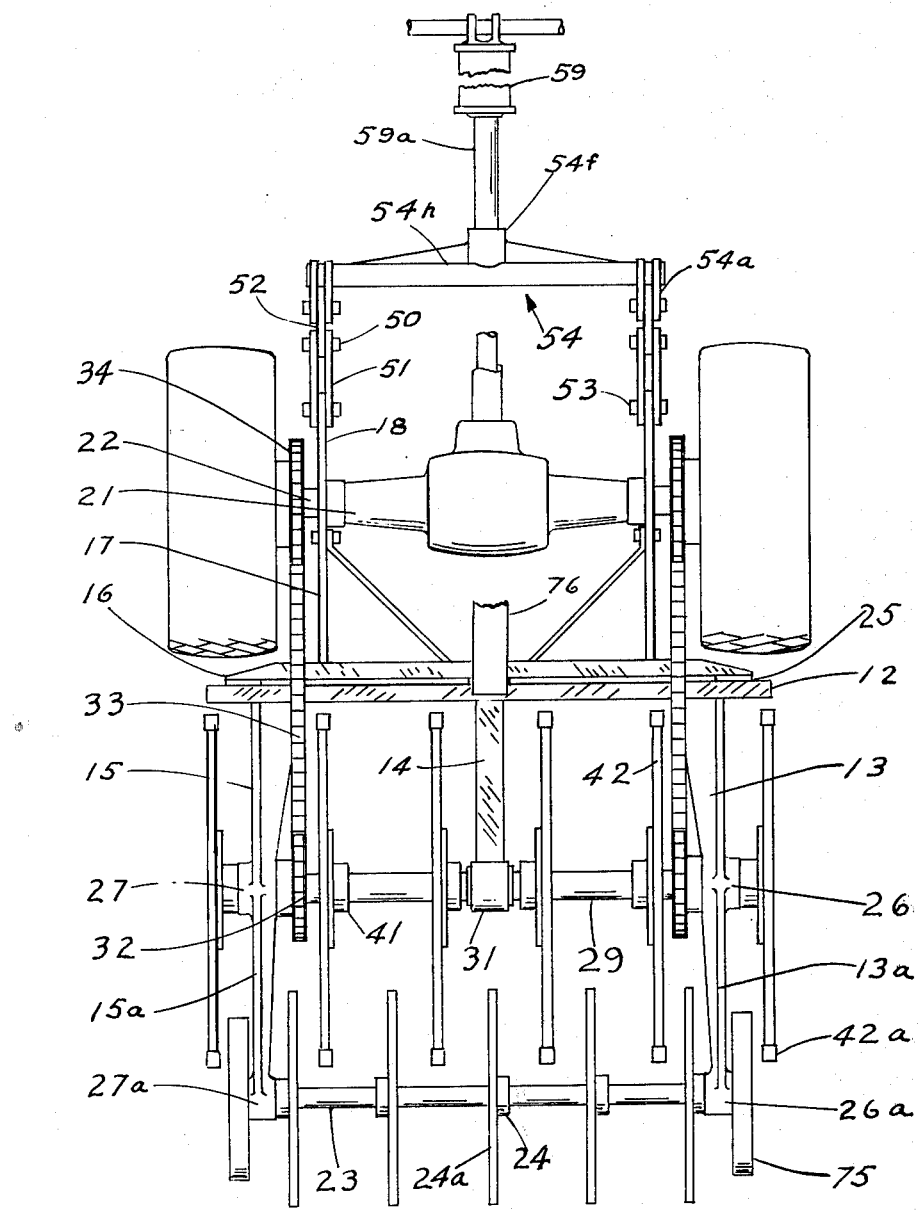
FIG. 3 is a fragmentary, top plan view of the structure shown in FIG. 2.

As may be seen in FIG. 3, the apparatus of the present invention includes a generally E-shaped frame portion composed of a primary beam or member 12, from which extend rearwardly three tiller shaft mounting legs 13, 14, and 15. As best may be seen in FIG. 3, the portion 12 of the frame is bolted or otherwise rigidly secured for construction and removal purposes, to a horizontal beam 16, which is rigidly attached to the spaced arms 17. The arms 17, together with arms 18, (FIG. 2) form part of a bell crank which is pivotally carried on the tractor driving axle 22, or the axle housing 21. Spacers 25 provide for proper chain adjustment.

Bearings 26 and 27 are carried by the frame arms 13 and 15 respectively (FIG. 3), and journal for rotation, a tiller shaft 29. Centrally the tiller shaft is provided with a swivel joint enclosed by a central bearing 31, carried on the extremity of the central leg 14, of the frame. As will be evident from FIGS. 2 and 3, the tiller shaft 29 has rigidly attached to it, chain sprockets 32 which accommodate the chains 33. The chains extend to sprockets 34 mounted on and rotated with the tractor driving axle or wheel hubs. From FIGS. 2 and 3, it will be evident that rotation of the driving axle 22 results in rotation of the tiller shaft 29 through the transmission links provided by the chains 33.

As may best be seen in FIG. 3, in addition to the sprockets 32, the tiller shaft 29 also carries, along its length, a plurality of flanged hubs 41, each having a series of spaced tines 42, extending outwardly for penetration into the ground. As best may be seen in FIGS. 2 and 3, each of the tines is upset at its end to provide an enlarged, pointed tip 42a. The tiller shaft and tines 42, are shown in FIG. 1 in raised or stowed position. The means for moving the tines between stowed and operating positions includes the link member 51, pivotally attached at its end to the arm 18, and at its opposite end to the depending link 52. The link 52 is provided with a stationary pivot 53 which is attached to the tractor frame, and the pivotal juncture of the members 51 and 52, identified at 50 in FIG. 2 is actuated by the rearwardly extending portion 54a, of a yoke indicated generally as 54 in FIG. 3. The yoke 54 has a horizontal portion 54h (FIG. 3), which extends adjacent to the opposite tractor wheel, and it will be understood is provided with another rearwardly extending portion 54a which is pivotally connected to the opposite members 51 and 52 adjacent the opposite tractor drive wheel from that shown in FIG. 1. It will be understood that there are two identical linkage assemblies; only one appearing in FIGS. 1 and 2. Extending centrally and forward from the yoke is a portion 54f (FIG. 3) which is mechanically coupled to hydraulic cylinder 59, the cylinder 59 being carried forwardly on the underside of the tractor as will be evident from FIG. 1. In FIG. 2, when the thrust member 59a of the hydraulic cylinder is extended or moved leftwardly, the link 52 will be rotated counterclockwise on pivot 53 as viewed in FIG. 2, thereby moving links 51 upwardly and rotating the arms 17 and 18 counterclockwise, lowering the tiller assembly to its operating position in which the tines 42 penetrate the ground.

Extending rearwardly from tiller shaft bearings 26 and 27 are portions, (as seen in FIGS. 2 and 3), 13a and 15a of the legs 13 and 15, respectively, carrying at their extremities, bearings 26a and 27a. Journaled in said bearings is shaft 23, having rigidly fixed thereon a plurality of clod shedding units 24, each having a plurality of arcuate curved tines 24a fastened generally radially with their curves in the opposite direction to those of the tilling tines 42. The shedders are positioned and spaced so that they engage the ground as the implement moves forward, the ground turning them in the same forward direction as the tilling tines 42, thereby knocking down whatever clods may be picked up between pairs of adjacent tines 42. Also mounted on shaft 23 are a plurality of depth control wheels 75, shown in

FIG. 2.

A stop 76 (FIGS. 1 and 3) may be attached to the tractor frame, which limits the upward travel of the tilling assembly and consequently, prevents the tractor from rearing back, which might cause injury to the operator or damage to the raising and lowering mechanism. A chain guard 77, shown in broken lines in FIGS. 1 and 2, may also be provided.

In operation, the tilling assembly is moved from the stowed solid line position in FIG. 1 to its lowered broken line position for entry and exit of the tines 42 into the soil. It will be noted that the arrangement of the linkage between the hydraulic cylinder 59 and the members 17 and 18 is such that as the frame and tiller shaft 29 approach their lowered position, the force provided by the hydraulic cylinder acting through the links 51 and 52 will be applied with substantial toggle arm advantage in moving the tilling assembly to the operating position as in FIG. 2.

Figure 4:
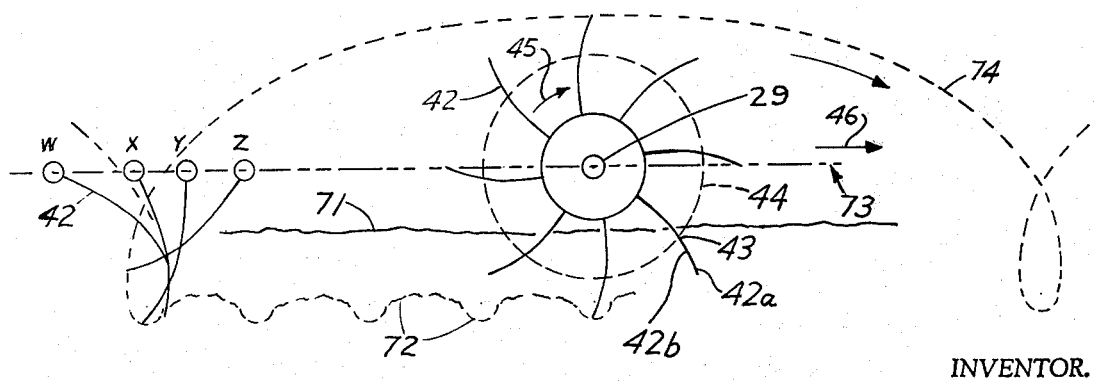
FIG. 4 is a schematic diagram illustrating the action of the tines as the tilling apparatus is moved over the ground surface.

Referring to FIG. 4, the ground level is indicated at 71, and the tilling depth in profile is indicated in broken lines at 72. A single tine 42 is represented in its progressive positions identified at W, X, Y, and Z. Each of the tines progressively moves through the working positions indicated W, X, Y, and Z as the tiller shaft moves horizontally above the ground level, this horizontal path of motion of the shaft 29 being indicated by the line 73. The tip of the tine will have a path as indicated by the broken line 74 in FIG. 4, the tine tip moving in this path as the tiller is operated. It will be noted that the path of the tine tip is curtate cycloidal curve and that the tines sequentially penetrate, pry loose, and lift up a portion of the soil and provide a pocketed tilling level profile as indicated at 72. The tines each are shaped in the form of a segment of a cycloidal curve but tempered or curved somewhat more sharply into true arc form. This configuration, together with the enlarged portion at their free ends, permits them to enter and move through the ground with a minimum of resistance as they progress through their positions indicated at W, X, Y, and Z in FIG. 4.

Elaborating on this operation, it is inherent from the above description that the path of the tine tips 42a along a curtate cycloidal curve requires the selection of a proper drive ratio between sprockets 32, 34. It is further inherent in the geometry of the described apparatus wherein the tines 42 are curved in the form of a segment of a curtate cycloidal curve as stated above, there will be points 43 on the shanks of the tines that will follow a cycloidal curve. These points 43, which may be referred to as the primary or lowest fulcrum points of the tines 42, define an imaginary circle shown in dashed lines at 44, which may be referred to as a "pitch circle". The gear ratio, i.e., the ratio of the number of teeth on front sprocket 34 to the number of teeth on rear sprocket 32, is such that if pitch circle 44 were resting on the ground level 71, its circumferential speed, as shown by arrow 45, would be equal to the forward ground speed of tractor 10, as shown by arrow 46, i.e., it would roll forwardly without slipping. It will be seen that the diameter of pitch circle 44 is determined by the gear ratio, i.e., the ratio of the diameter of drive wheels 11 to the diameter of pitch circle 44 is equal to the gear ratio. Thus, the gear ratio must be selected to provide a pitch circle 44 having a diameter such that the motion of a tip 42a defines curtate cycloidal curve 74; if tines 42 are rotated too fast or too slowly with respect to the forward ground speed, the motion of a tip 42a will not define the desired curtate cycloidal curve shown at 74 in FIG. 4. In a working embodiment of the invention, the gear ratio is 36 to 30.

As a result of the above-described curving of the tines and the selected gear ratio, each of the tines 42 in succession penetrates into the ground with the shank portions 42b thereof generally following the tips 42a into the ground, as shown in FIG. 4, whereby the tine penetrates into the ground with a minimum of resistance. As each tine continues to rotate, the tip 42a thereof generates the curtate cycloidal curve 74 with the fulcrum points 43 enabling each of the tines 42 to pry and lift a portion of the earth thereabout.

Figure 5:
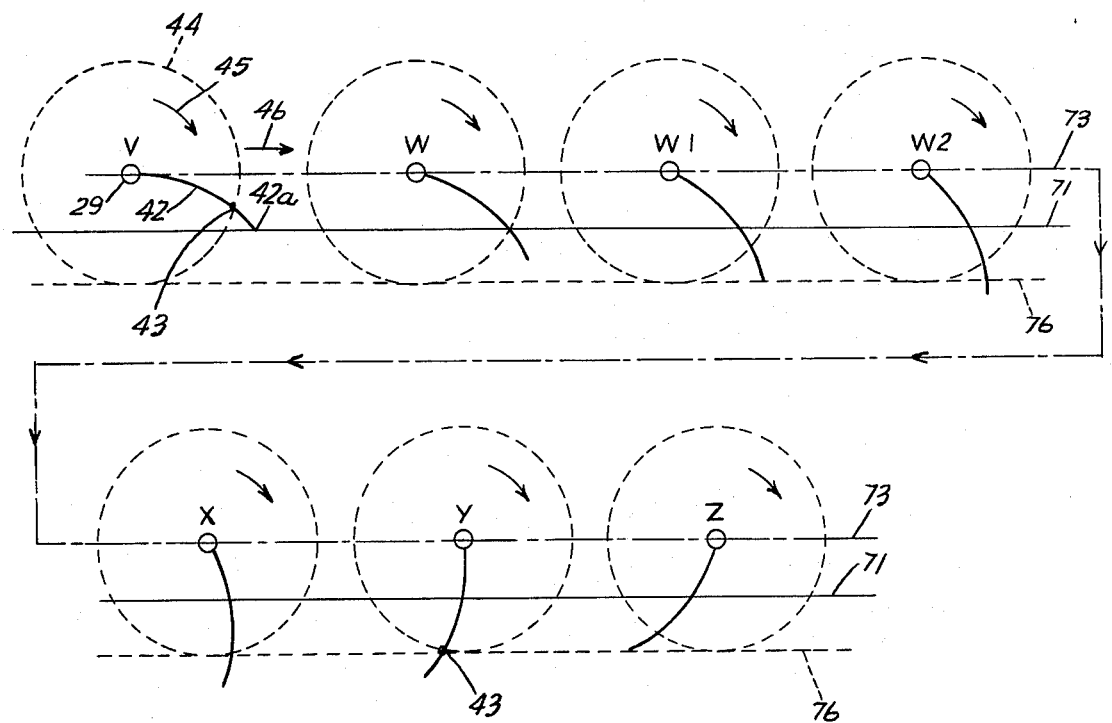
FIG. 5 is a schematic diagram further illustrating the action of the tines.

Referring now additionally to FIG. 5 in conjunction with FIG. 4, it will be seen that with tines 42 at their maximum penetration, as determined by depth control wheels 75 (FIGS. 1, 2 and 3), pitch circle 44 rolls on an imaginary ground plane or pitch line shown in dashed lines at 76 with its circumferential speed as shown by arrow 45 equal to its forward speed as shown by arrow 46. It will further be seen that from position W1 in which tip 42a of a tine 42 is at ground plane 76, through position W2 to the bottom position X, tip 42a is forced substantially straight downwardly with shank portion 42b following in the pocket formed by tip 42a much in the manner of a spade being forced into the ground by foot-force. As rotation and forward movement continues from position X through position Y to position Z, the earth is pried upwardly by tine 42 acting about fulcrum point 43, again much in the manner of a spade with the handle forced downwardly and rearwardly.

Figure 6:
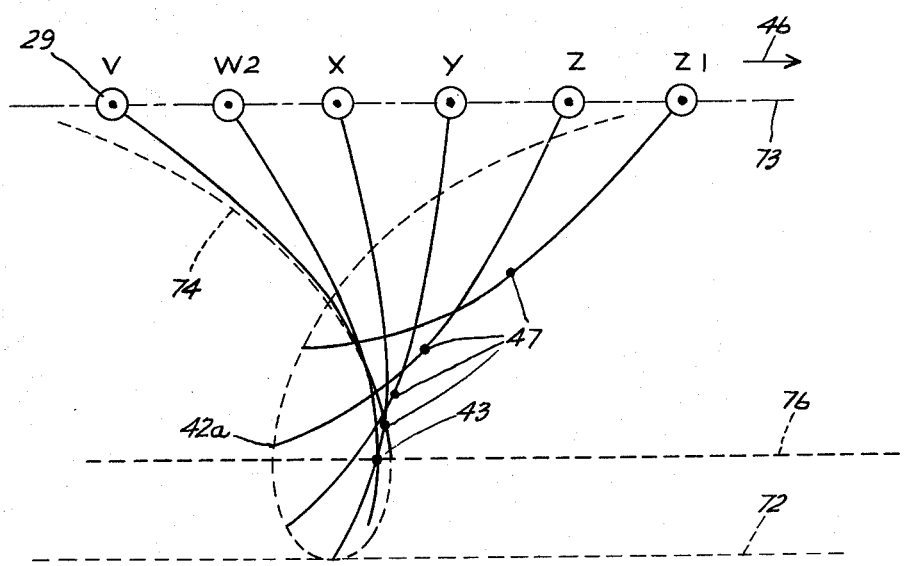
FIG. 6 is another schematic diagram still further illustrating the action of the tines.

Referring now also to FIG. 6 in conjunction with FIGS. 4 and 5, it will be seen that the prying action commences at position X with tip 42a of tine 42 at its lowest or bottom position. As tip 42a moves rearwardly and upwardly from position X through positions Y, Z and Z1 (generating curtate cycloid path 74), the actual or resultant fulcrum point 47 progressively moves up the tine toward axle 29 (much in the manner of a teeter-totter on a barrel which is a blunt fulcrum like the ground with respect to tines 42).

It will be observed that this operation is in sharp contrast to the conventional ground tilling devices wherein the tines are typically rotated at a substantially greater speed than the forward ground speed of the tractor. In these prior art devices, the tines typically cut into the earth to thereby chop or dig it up. On the other hand, the tines 42 of the present invention pierce or push into the ground and simply pry up portions of the earth. This results in a tilling apparatus which requires substantially less power to operate and wherein the tilled earth is pried loose in a pocketed configuration as opposed to the grooved or furrowed configuration resulting from the operation of prior art tilling devices. This pocketed bottom configuration reduces water run off and soil loss.

While there have been described above the principles of this invention in connection with specific apparatus, it is to be clearly understood that this description is made only by way of example and not as a limitation to the scope of the invention.

What is claimed is:

1. Tilling apparatus comprising a supporting frame adapted to be coupled to a tractor having a drive axle, a tiller shaft journaled on said frame for rotation about an axis parallel with and spaced from said drive axle, said tiller shaft having fixedly secured thereto a plurality of circumferentially spaced-apart, radially extending, ground penetrating tines, each said tine having a pointed tip and a shank portion intermediate said shaft and tip, means drivingly coupling said tractor to said tiller shaft for rotating the tiller shaft in the same direction as and at a predetermined speed ratio with respect to said axle, said ratio being selected so that an imaginary circle concentric with said tiller shaft and defined by points on said shank portions rotates at a circumferential speed substantially equal to the ground speed of said tractor whereby said tips generate a curtate cycloidal curve as said tines rotate and said tiller shaft is moved forwardly, each of said tines being smoothly curved from its tip toward said shaft forwardly in the direction of rotation thereof generally along a true arc which approximates the segment of said curtate cycloidal curve generated as its tip enters the ground whereby said tips pierce the ground by curtate cycloidal movement with the respective shank portions following in the holes formed by the tips.

2. The apparatus of claim 1 further comprising means for pivotally coupling said frame to said tractor for movement between raised and lowered positions, said frame extending rearwardly from said drive axle, and means connected to said tractor and acting on said frame for forcing said tines downwardly into the ground.

3. The apparatus of claim 2 further including depth regulating wheels rotatably mounted on said frame, said depth regulating wheels engaging the surface of the ground when said tilling apparatus is in said lowered position.

4. The apparatus of claim 1 wherein said coupling means includes a first sprocket operatively coupled to said tractor drive axle, a second sprocket fixedly secured to said tiller shaft, and an endless drive element operatively coupled between said sprockets.

5. The apparatus of claim 1 further including a second shaft journaled on said frame and having fixedly secured thereto a plurality of clod shedding tines, the distal ends of said clod shedding tines engaging the ground as said apparatus moves forwardly thereby producing rotational movement thereof, said clod shedding tines moving along paths such that the distal ends thereof pass closely adjacent and in the opposite direction to said ground penetrating tines thereby to remove clods therefrom.

6. The apparatus of claim 1 wherein there are a plurality of groups of said ground penetrating tines, each of said groups being longitudinally spaced apart on said tiller shaft and the tines of each group being regularly circumferentially spaced apart thereon.

\* \* \* \* \*